(12) United States Patent
Blaschke

(10) Patent No.: US 11,305,597 B2
(45) Date of Patent: Apr. 19, 2022

(54) APPARATUS FOR PULLING TRAVEL TRAILERS

(71) Applicant: Michael Blaschke, Rosenberg, TX (US)

(72) Inventor: Michael Blaschke, Rosenberg, TX (US)

( * ) Notice: Subject to any disclaimer, the term of this patent is extended or adjusted under 35 U.S.C. 154(b) by 0 days.

(21) Appl. No.: 17/009,906

(22) Filed: Sep. 2, 2020

(65) Prior Publication Data
US 2020/0398909 A1 Dec. 24, 2020

Related U.S. Application Data

(63) Continuation of application No. 16/157,868, filed on Oct. 11, 2018.

(51) Int. Cl.
| | | |
|---|---|---|
| *B60D 1/07* | (2006.01) | |
| *B62D 53/06* | (2006.01) | |
| *B60D 1/06* | (2006.01) | |
| *B60D 1/64* | (2006.01) | |
| *B60T 7/20* | (2006.01) | |

(52) U.S. Cl.
CPC ............... *B60D 1/075* (2013.01); *B60D 1/06* (2013.01); *B60D 1/64* (2013.01); *B60T 7/20* (2013.01); *B62D 53/065* (2013.01)

(58) Field of Classification Search
CPC .................................. B60D 1/07; B60D 1/075
See application file for complete search history.

(56) References Cited

U.S. PATENT DOCUMENTS

| | | | | |
|---|---|---|---|---|
| 3,796,443 A | * | 3/1974 | Crutchfield | B60D 1/488 280/406.2 |
| 3,810,661 A | * | 5/1974 | Lowrance | B60D 1/06 280/417.1 |
| 3,815,936 A | * | 6/1974 | Oaks, Jr. | B62D 53/061 280/417.1 |
| 3,840,252 A | * | 10/1974 | Jocoy | B62D 53/0828 280/417.1 |
| 3,889,978 A | * | 6/1975 | Kann | B60D 1/065 280/417.1 |
| 4,832,358 A | * | 5/1989 | Bull | B62D 53/061 280/418.1 |
| 5,797,614 A | * | 8/1998 | Hord | B62D 63/08 280/417.1 |
| 6,364,432 B1 | * | 4/2002 | Mixon | B60T 7/20 303/124 |
| 6,474,673 B1 | * | 11/2002 | Biggins | B60D 1/07 280/417.1 |
| 2003/0184046 A1 | * | 10/2003 | Bourgault | B60D 1/143 280/417.1 |

(Continued)

*Primary Examiner* — Kevin Hurley
(74) *Attorney, Agent, or Firm* — Antony P. Ng; Russell Ng PLLC

(57) ABSTRACT

An apparatus for pulling travel trailers is disclosed. The apparatus for pulling a travel trailer includes an extension arm and a frame. One end of the extension arm is connected to a ball coupler, and another end of the extension arm is connected to the frame. The ball coupler is to be rotatably coupled to a gooseneck ball located on a towing truck. The frame includes a hitch ball to be coupled to a hitch ball receptacle from the travel trailer. A pair of mounting arms is extended from the frame, and a pair of clamping brackets is rotatably connected to the pair of mounting arms via a pair of hinges, respectively. The clamping brackets are configured to secure to an A-frame of the travel trailer via a set of pins.

6 Claims, 5 Drawing Sheets

(56) References Cited

U.S. PATENT DOCUMENTS

| | | | |
|---|---|---|---|
| 2006/0027997 A1* | 2/2006 | Grace | B60D 1/247 280/417.1 |
| 2018/0222454 A1* | 8/2018 | Crow | B60T 7/20 |
| 2021/0229511 A1* | 7/2021 | Farquer | B60D 1/62 |

* cited by examiner

APPARATUS FOR PULLING TRAVEL TRAILERS

RELATED APPLICATION

The present application is a continuation-in-part of U.S. application Ser. No. 16/157,868 filed on Oct. 11, 2018, the contents of which are incorporated herein by reference.

TECHNICAL FIELD

The present invention relates to trailer hitching equipment in general, and in particular to an apparatus for pulling travel trailers.

BACKGROUND

Millions of Americans have enjoyed the freedom of traveling in a travel trailer (or camper) that provides the comfort of housing with all compartments on a similar level. A conventional travel trailer can be hitched to a standard bumper hitch of a truck such that it can be towed by the truck.

When comparing to the towing of a boat trailer, the towing of a travel trailer can be much more challenging because of its height and length. For example, an average travel trailer is about 10 feet tall and 20 feet in length. Thus, it is not uncommon that a travel trailer will constantly sway with respect to a towing truck when traveling at over 60 miles per hour on a highway facing a gusty wind. Because of the location of the bumper hitch and the weight of a travel trailer, the truck pulling the travel trailer may also experience some traction loss on the front tires.

Consequently, it would be desirable to provide an improved apparatus for pulling travel trailers.

SUMMARY

In accordance with a preferred embodiment of the present invention, an apparatus for pulling a travel trailer includes an extension arm and a frame. One end of the extension arm is connected to a ball coupler, and another end of the extension arm is connected to the frame. The ball coupler is to be rotatably coupled to a gooseneck ball located on a towing truck. The frame includes a hitch ball to be coupled to a hitch ball receptacle from the travel trailer. A pair of mounting arms is extended from the frame, and a pair of clamping brackets is rotatably connected to the pair of mounting arms via a pair of hinges, respectively. The clamping brackets are configured to secure to an A-frame of the travel trailer via a set of pins.

All features and advantages of the present invention will become apparent n the following detailed written description.

BRIEF DESCRIPTION OF TUE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
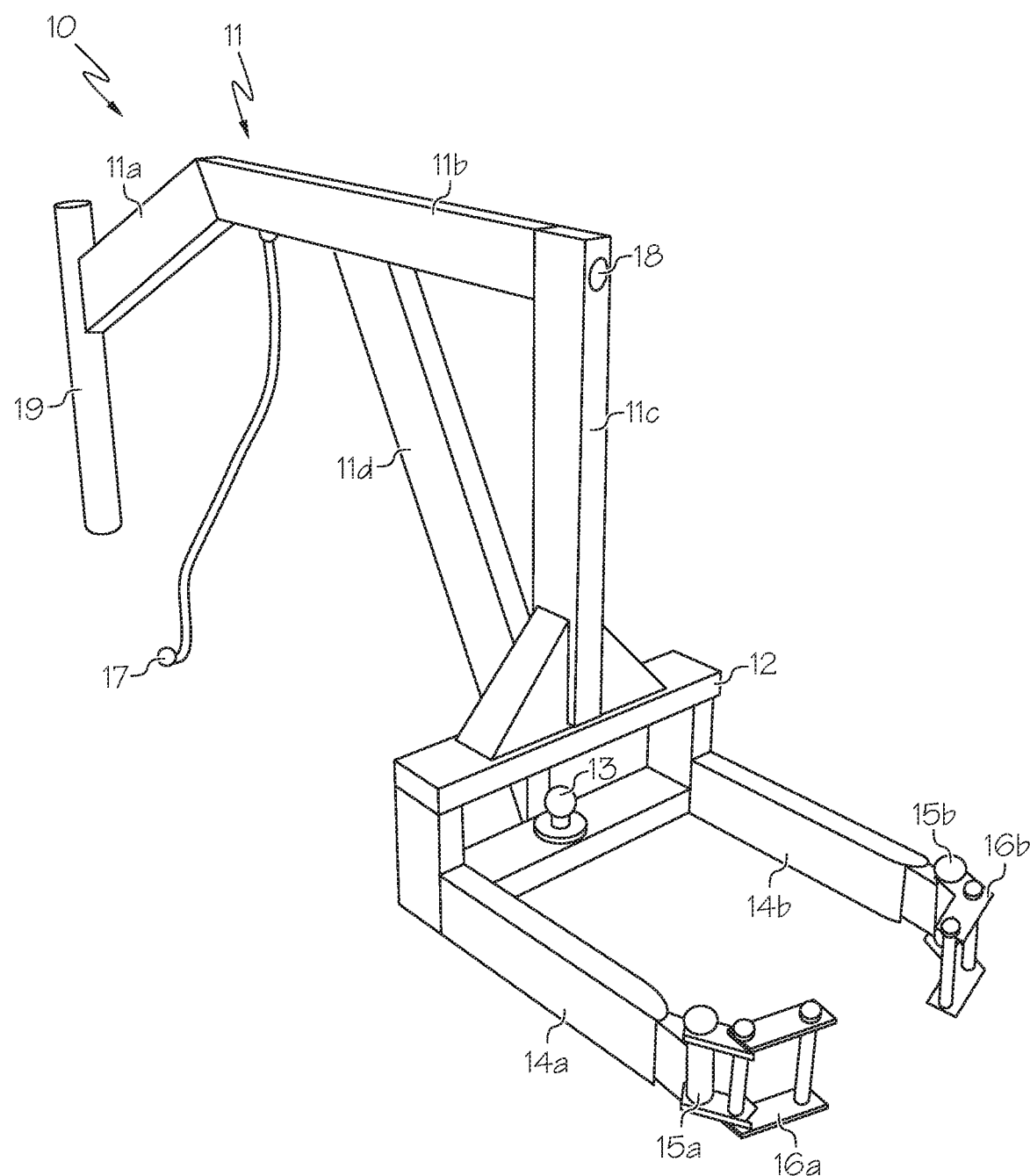
FIGS. 1-2 are isometric views of an apparatus for pulling travel trailers, according to one embodiment.
Figure 2:
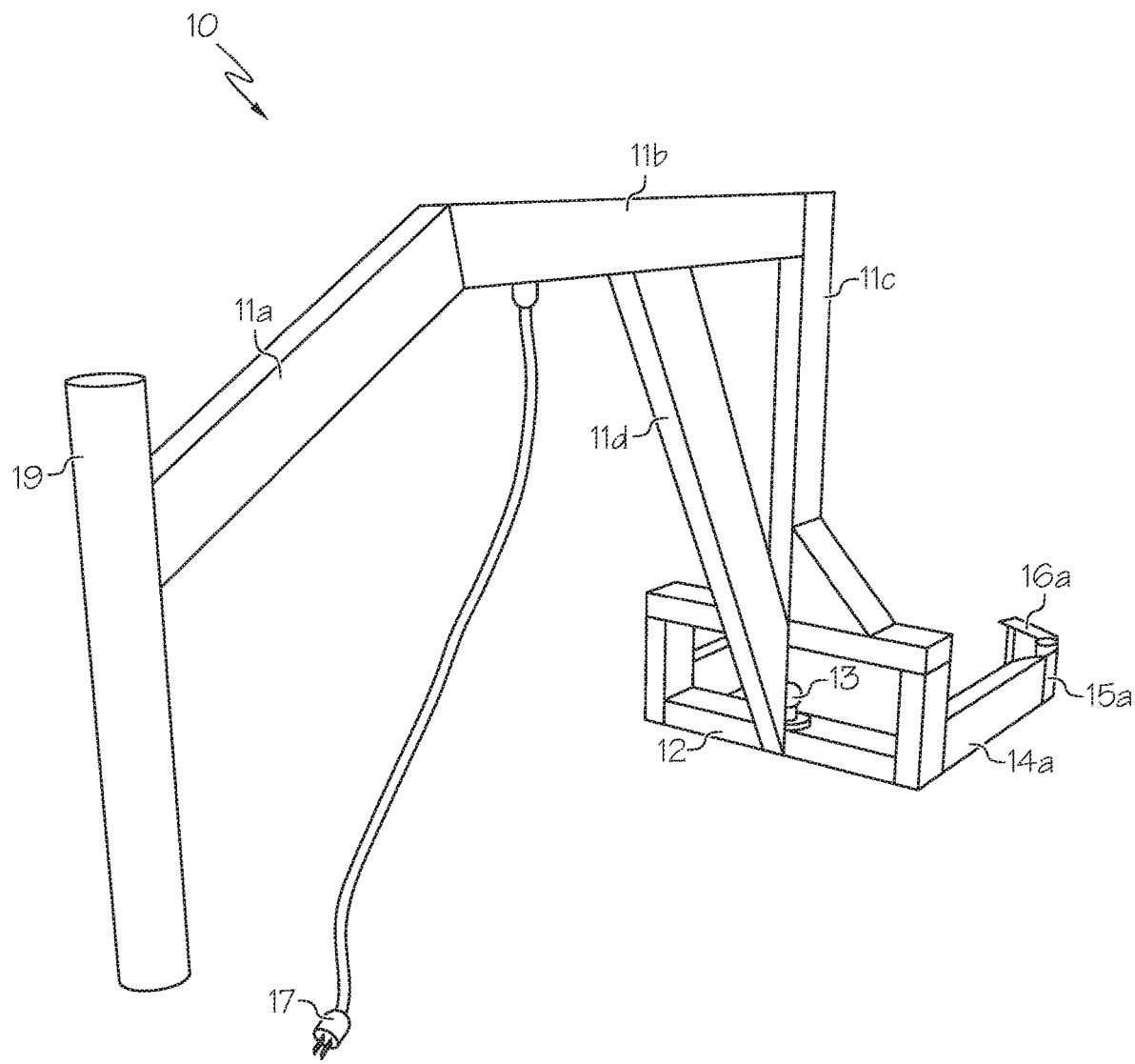
Figure 4:
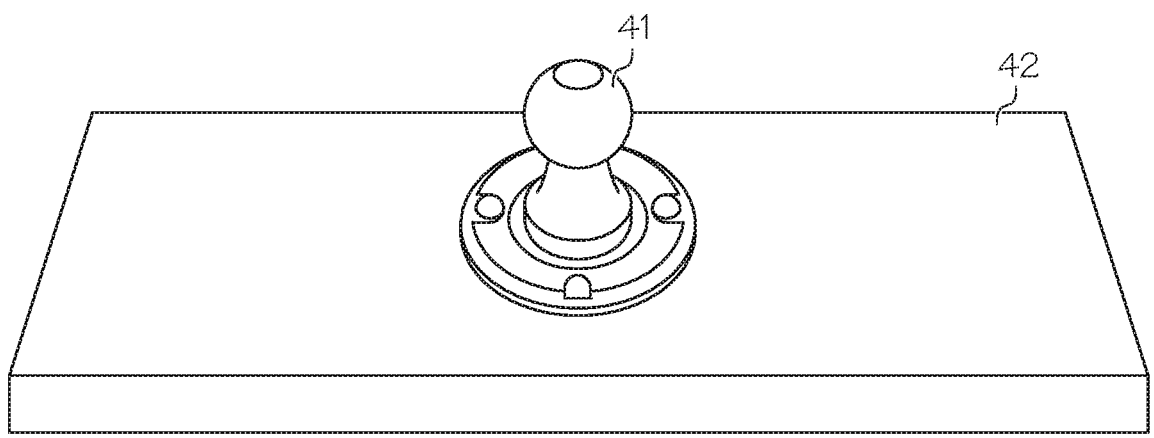
FIG. 4 is a diagram of a gooseneck ball on a bed of a towing truck.

Referring now to the drawings and in particular to FIGS. 1-2, there are illustrated isometric views of an apparatus for pulling travel trailers, according to one embodiment. As shown, an apparatus 10 includes an extension arm 11 connected to a frame 12. Extension arm 11 is also connected to a ball coupler 19. Ball coupler 19 is to be coupled to a gooseneck ball located in a truck bed of a truck, such as a gooseneck ball 41 located in a bed 42 of a truck, as shown in FIG. 4. Ball coupler 19 can be rotatably secured to the gooseneck ball via a latch (not shown).

For the present embodiment, extension arm 11 is formed by multiple beams 11a, 11b and 11c. In addition, a beam 11d is connected between beams 11b and 11e to provide additional structural support. Although extension arm 11 is constructed with multiple beams 11a-11e, it is understood by those skilled in the art that extension arm 11 can also be constructed with a single beam.

Figure 5:
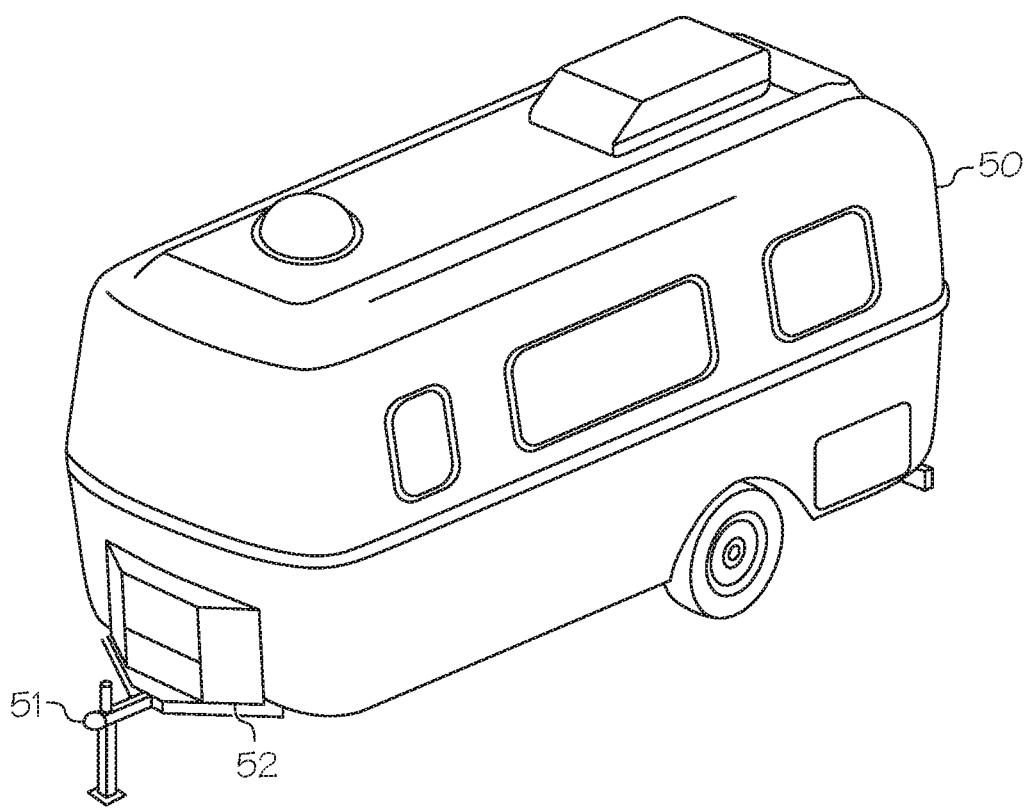
FIG. 5 is an example of a travel trailer having a bumper hitch.

Beam 11c is connected to frame 12 that is also connected to a pair of mounting arms 14a, 14b. For the present embodiment, frame 12 includes four beams that forms a rectangular frame. A hitch ball 13 is secured in a center position on one of the two horizontal beams of frame 12. Hitch ball 13 is configured to be rotatably coupled to a ball receptacle located on an A-frame of a travel trailer, such as a ball receptacle 51 located on an A-frame 52 of a travel trailer 50, as shown in FIG. 5. A clamping bracket 16a is connected to mounting arm 14a via a hinge 15a such that clamping bracket 16a can be rotated with respect to mounting arm 14a via hinge 15a. Similarly, a clamping bracket 16b is connected to mounting arm 14b via a hinge 15b such that clamping bracket 16b can be rotated with respect to mounting arm 14b via hinge 15b.

Extension arm 11 also includes an electrical plug 17 and an electrical socket 18 to provide electrical connections between a towing truck and a travel trailer.

Extension arm 11, frame 12, hitch ball 13, mounting arms 14a-14b, hinges 15a-15b, clamping brackets 16a-16b, and ball coupler 19 are preferably made of durable materials, such as iron, steel, brass, and/or aluminum alloy, that provide substantial structural strength.

Figure 3:
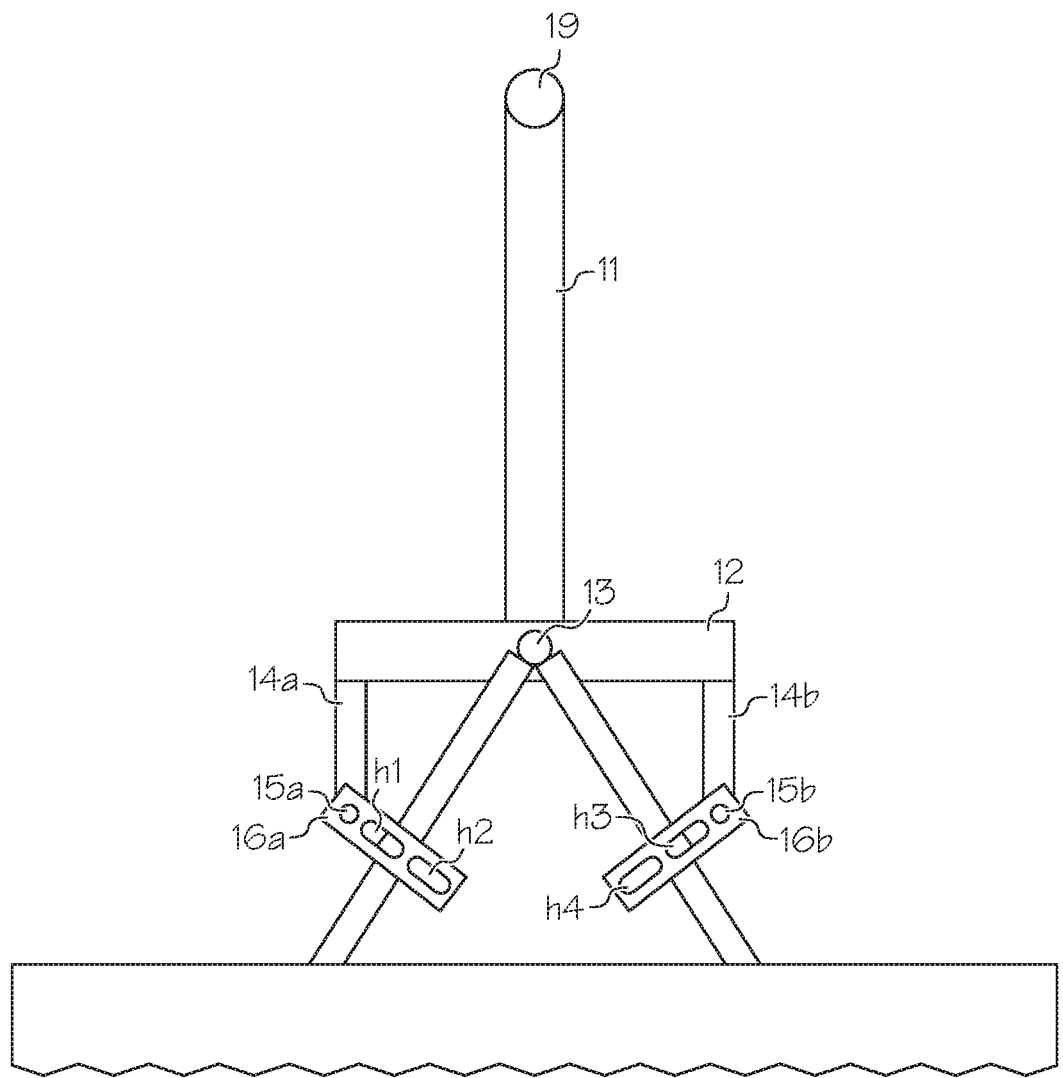
FIG. 3 is a top view of the apparatus from FIG. 1 showing the clamping brackets of the apparatus from FIG. 1 being secured to an A-frame of a travel trailer.

Referring now to FIG. 3, there is illustrated a top view of apparatus 10, according to one embodiment. As shown, after hitch ball 13 has been rotatably coupled to a ball receptacle, such as ball receptacle 51 from FIG. 5, of a travel trailer, clamping brackets 16a-16b can be secured to an A-frame, such as A-frame 52 from FIG. 5, via a set of pins or bolts and screws (not shown) going through holes h1-h4 located on clamping brackets 16a-16b correspondingly. For the present embodiment, a first arm of the A-frame is secured between hole h1 and hole h2 of mounting bracket 16a via a first set of pins, and a second arm of the A-frame is secured between hole h3 and hole h3 of mounting bracket 16b via a second set of pins.

In addition, ball coupler 19 and extension arm 11 are in alignment with hitch ball 13. This linear configuration provides a visual cue to allow a driver of a towing truck to be able to quickly line up ball coupler 19 to a gooseneck ball located on the bed of the towing truck in order to rotatably couple ball coupler 19 to the gooseneck ball without additional assistance, after apparatus 10 has been secured to a travel trailer.

As has been described, the present invention provides an apparatus for pulling travel trailers. With the apparatus, the travel trailer will not sway when moving at a high speed and the stability of the towing vehicle can be maintained.

While the invention has been particularly shown and described with reference to a preferred embodiment, it will be understood by those skilled in the art that various changes in form and detail may be made therein without departing from the spirit and scope of the invention.

What is claimed is:

1. An apparatus for pulling a travel trailer, said apparatus comprising:
   an extension arm;
   a ball coupler connected to one end of said extension arm, wherein said ball coupler is to be rotatably coupled to a gooseneck ball located on a truck bed;
   a frame connected to another end of said extension arm;
   a hitch ball located on said frame, wherein said hitch ball is to be coupled to a hitch ball receptacle located on said travel trailer;
   a first mounting arm extended from said frame, includes
      a first hinge; and
      a first clamping bracket rotatably connected to said first mounting arm via said first hinge, wherein said first clamping bracket includes a first pair of pins to receive a first arm of an A-frame of said travel trailer between said first pair of pins;
   a second mounting arm extended from said frame, includes
      a second hinge; and
      a second clamping bracket rotatably connected to said second mounting arm via said second hinge, wherein said second clamping bracket includes a second pair of pins to receive a second arm of said A-frame of said travel trailer between said second pair of pins.

2. The apparatus of claim 1, wherein said first arm of said A-frame of said travel trailer is to be secured between said first pair of pins of first clamping bracket.

3. The apparatus of claim 2, wherein said second arm of said A-frame of said travel trailer is to be secured between said second pair of pins of second clamping bracket.

4. The apparatus of claim 1, wherein said first clamping bracket is allowed to rotate with respect to said first mounting arm via said first hinge, and said second clamping bracket is allowed to rotate with respect to said second mounting arm via said second hinge.

5. The apparatus of claim 1, wherein said extension arm, said ball coupler, and said hitch ball are in linear alignment.

6. The apparatus of claim 1, wherein said extension arm further includes an electrical plug and an electrical receptacle.

* * * * *